United States Patent
Wagner

(12) 
(10) Patent No.: US 6,344,102 B1
(45) Date of Patent: Feb. 5, 2002

(54) EMBOSSING METHOD FOR PRODUCING A STRUCTURED VOLUMINOUS NONWOVEN

(75) Inventor: Werner Wagner, Bad Nenndorf (DE)

(73) Assignee: Advanced Design Concepts GmbH, Hannover (DE)

( * ) Notice: Subject to any disclaimer, the term of this patent is extended or adjusted under 35 U.S.C. 154(b) by 0 days.

(21) Appl. No.: 09/445,980
(22) PCT Filed: Jun. 5, 1998
(86) PCT No.: PCT/EP98/03384
§ 371 Date: Jan. 31, 2000
§ 102(e) Date: Jan. 31, 2000
(87) PCT Pub. No.: WO98/58109
PCT Pub. Date: Dec. 23, 1998

(30) Foreign Application Priority Data

Jun. 18, 1997 (DE) .......................................... 197 25 749

(51) Int. Cl.[7] .............................................. B32B 31/00
(52) U.S. Cl. ..................... 156/229; 156/290; 156/308.4
(58) Field of Search ................................. 156/209, 229, 156/290, 308.2, 308.4, 494, 533, 555, 581, 582

(56) References Cited

U.S. PATENT DOCUMENTS

| | | | |
|---|---|---|---|
| 4,592,943 A | 6/1986 | Cancian et al. ............. | 428/171 |
| 4,774,124 A | 9/1988 | Shimalla et al. ............ | 428/171 |
| 5,356,364 A | 10/1994 | Veith et al. ................. | 493/395 |
| 5,399,174 A | 3/1995 | Yeo et al. .................... | 604/365 |
| 5,468,323 A | * 11/1995 | McNeil ....................... | 156/209 |
| 6,059,003 A | * 5/2000 | Wittkopf ..................... | 156/555 |
| 6,149,755 A | * 11/2000 | McNichols et al. ......... | 156/264 |

FOREIGN PATENT DOCUMENTS

DE 19547319 6/1997

\* cited by examiner

Primary Examiner—James Sells
(74) Attorney, Agent, or Firm—Milde, Hoffberg & Macklin, LLP

(57) ABSTRACT

The invention relates to a method for producing a structured voluminous non-woven fabric, comprising the following steps: producing a spunbonded non-woven fabric consisting of a plurality of monofilaments which are stretched only at 50 to 70% of the maximum possible stretch range to form a fiber skein and subsequent processing the raw non-woven fabric by means of a second pair of rollers (10a, b) with a metal outer jacket to improve the velvet finish. In the second pair of rollers, the positive elements of the positive roller are nops (11) arranged in rows and the surface of the negative roller has lamellas (13) which are arranged in an axial direction and provided with intermediate recesses (14) so that when the rollers roll against each other the lamellas engage in the channels left open by the nops.

25 Claims, 3 Drawing Sheets

EMBOSSING METHOD FOR PRODUCING A STRUCTURED VOLUMINOUS NONWOVEN

BACKGROUND OF THE INVENTION

The invention relates to a method for producing a structured voluminous nonwoven comprising the following processing steps:

(a) manufacturing a spunbonded fabric consisting of a multitude of monofilaments that are stretched only at 50 to 70% of the maximum possible stretch range and are deposited as a fiber strand, (b) pressing and welding the fiber strand into a raw nonwoven by using a first pair of rollers, and (c) subsequently processing the raw nonwoven using a second pair of rollers, where at least one of the outer roller surfaces is made of metal and that consists of a positive roller with numerous projecting elements distributed across the outer surface of the roller, and of a negative roller with equally numerous recesses, where during the rolling process the projecting elements engage in the recesses and post-stretch the raw nonwoven in the area of the roller engagements.

The process described in the German Patent Application No. DE 195 47 319.1 is based on the state-of-the-art according to U.S. patent application Ser. No. 5,399,174. This U.S. patent describes a laminated foil where a nonwoven layer, which consists of crimped polymeric fiber bundles and is laminated with a polymeric foil, is embossed with the use of rollers such that a connecting and decorating pattern is created and connects the nonwoven with the foil. In the U.S. patent noted above, the section "BACKGROUND OF THE INVENTION" also mentions that roller embossing is a kind of method that alters the feel of the nonwoven and at the same time adds a decorative design. Reference is made to the U.S. Pat. No. 4,592,943, among others, according to which a prior method is used, where the nonwoven is heated while the nonwoven foil to be processed passes through two grids such that the grid in its specific design is transmitted to the nonwoven and a corresponding image is formed. Additional reference is made to the U.S. Pat. No. 4,774,124, which discloses a pattern roller embossing method.

Also known, from the U.S. Pat. No. 5,356,364, is an embossing method, where unmatched male (positive) and female (negative) elements of two rollers provide an embossing process that is said to provide a particular fleeciness and embossing pattern.

SUMMARY OF THE INVENTION

Based on the teaching of the aforesaid German Patent Application 195 47 319.1, the objective of the present invention is to provide a spunbonded fabric, which has already been deposited and already exhibits partially bonded fibers and filaments corresponding to the nonwoven method, with a defined increase in volume, building upon the teaching of this patent application and improving it further.

Processing is carried out by using a second pair of rollers, where the outer surfaces of the rollers are made of metal, preferably both rollers of the same metal with a Rockwell Hardness (HRC) greater than 50, where the projecting elements of the positive roller are protrusions arranged in rows and where the surface of the negative roller exhibits axially extending ribs or "lamellas" with recesses between them. With these axially arranged lamellas, which stretch across several protrusion distances, improved stretching of the 70% pre-stretched material can be achieved, in particular, a special structure that opens at the tip of the protrusions which, in the industry, is referred to as "apperturized nonwoven".

The openings are structured according to the geometry of the metal protrusions. In accordance with the amount of protrusions, one obtains a stronger opening and stronger perforation of the nonwoven. The openings have a shape turned out towards the back side of the nonwoven. On the usage side, the openings appear like delicate funnels that can also receive and transfer liquids. This effect is desired in a respective cover-stock material because liquids can be taken up and passed on. In addition, the three-dimensional structure that the nonwoven has assumed prevents the liquid from returning to the surface. The surface remains dry. In addition, the outside of the nonwoven has a soft, textile and pliable feel.

The fleeciness and the structure of the final product can largely be determined with the second pair of rollers. It is recommended to adjust the distance of the rollers of the second pair of rollers, thus adjusting the engagement of the rollers into one another. Preferably, the rollers used have a protrusion height of between 0.8 and 2 mm and the number of protrusions per 100 $cm^2$ roller surface is selected between 2000 and 3000.

The temperature of the rollers is also important. For example, the process is carried out with the negative roller at a lower temperature than the positive roller. Examples of such temperatures for the positive roller are between 175° C. and 190° C. and for the negative roller only between 40° C. and 80° C.

To obtain a funnel-shaped structure of the nonwoven, it is recommended that the protrusions end in tips with the tips exhibiting, for example, the shape of onion towers, that is, they have a controlled shape that is first rounded and then ends in a tip. However, it is also possible to let the tips end as pyramid-shaped tips with an acute angle of 90±20°.

Preferred initial materials for producing the nonwoven are polyethylene, polypropylene, polyesters or polyamide because these thermoplastics exhibit the desired fleeciness in a particularly pronounced manner.

Conventional methods are suitable as manufacturing methods for the nonwoven; for example, fabrics used as nonwovens are those manufactured by processes such as carding, airlaying or melt-blowing.

It is preferable to hold the raw nonwoven strand tight to the side at the roller edges during the second stretching such that it does not shrink. During the second stretching, that is, during the first run of the raw nonwoven strand through the second roller pair, the fabric is kept at a temperature that basically corresponds to the temperature that existed during the first stretching. The roller temperature, therefore, is maintained somewhat above and below this temperature.

The invention further relates to a pair of rollers, where the outer surfaces of the rollers are made of metal, where the male elements of the positive rollers are protrusions arranged in rows and where the surface of the negative roller exhibits lamella connectors in an axial direction with recesses between said lamellas such that during the rolling process the lamellas engage in the channels left open by the protrusions and where the length of the lamella connectors surpasses at least three protrusion distances.

For a full understanding of the present invention, reference should now be made to the following detailed description of the preferred embodiments of the invention as illustrated in the accompanying drawings.

BRIEF DESCRIPTION OF THE DRAWINGS

FIG. 2b shows in an additional detail an embodiment of the stretching profile rollers according to FIG. 2a.

DESCRIPTION OF THE PREFERRED EMBODIMENTS

Figure 1:
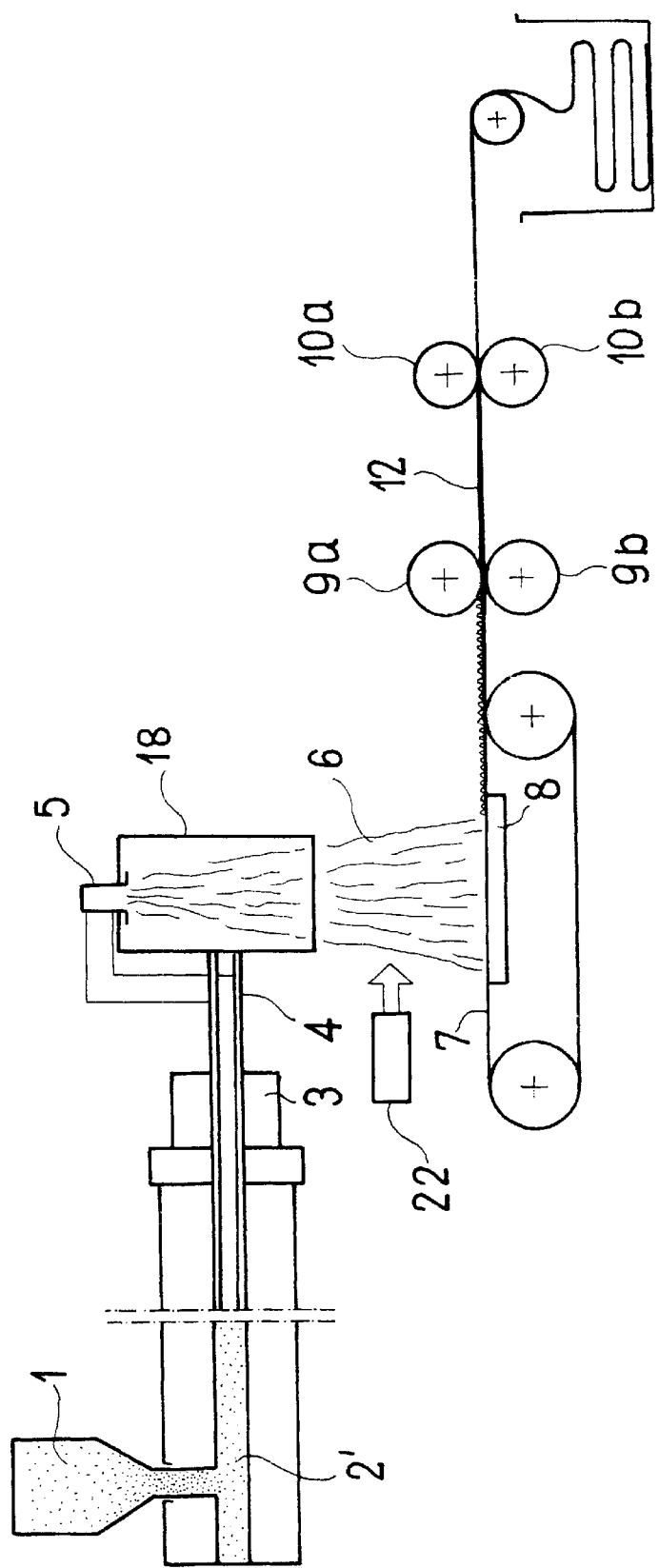
FIG. 1 is a schematic presentation of a device suitable for the process.

The preferred embodiments of the present invention will now be described with reference to FIGS. 1–3 of the drawings. Identical elements in the various figures are designated with the same reference numerals.

FIG. 1 shows schematically the manufacturing process of a structured, voluminous nonwoven. A storage silo 1 contains a thermoplastic granulate, for example of polyethylene, polyester, polypropylene or polyamide, that can be processed into the corresponding nonwoven. It enters a heatable extruder and is advanced to the mouthpiece 3 of the extruder by the extruder screw 2'. Thereafter, the extruded material is fed into a spinning nozzle 5 via a guide trunk 4. From the spinning nozzle 5, the spun strand separated into very fine strings, enters a stretching device 18 and then into the area of a chilling blower 22 used to cool down the spun strand 6.

The individual fiber is not stretched entirely in the stretching device 18. Advantageous is a stretching rate of 60 to 70% for polyethylene and polypropylene, or of 50 to 70% for polyester or polyamide. This is contrary to conventional stretching conditions where complete process stretching is preferred, for example, to save material.

The stretched spun strand 6 is placed on a grid conveyor 7 with a vacuum chamber 8 underneath, such that the spun strand lays flat on the grid conveyor 7. Said stand is then compressed between a first roller pair, namely calender rollers 9a and 9b. This processing step results in the raw nonwoven 12, which still has an area weight of about 20 g/m$^2$ and has a thickness of only a few millimeters.

The raw nonwoven 12 produced in this manner only received a very loose fleece-hardening in the calender rollers 9a and 9b, only slight localized melting has been carried out in order to make material processing easier.

The raw nonwoven 12 is now advanced to a second pair of rollers 10a, 10b consisting of two stretching profile rollers. Roller 10a is a positive roller with numerous protrusions 11 distributed across the outer surface of the roller, while the negative roller 10b is provided with equally numerous lamellas 13 with recesses 14 between said lamellas. During the rolling process, the protrusions 11 engage in the recesses 14 and stretch the raw nonwoven in the areas of the engagement.

With this stretching process by the two rollers 10a and 10b, a precisely defined localized over-extension of the fiber composite occurs because the raw strand 12 is held tight at the border, that is, at the outer edges of the rollers 10a and 10b and cannot be pulled towards the center. This means, the nonwoven is held tight in one area and is extremely stretched in the area immediately adjacent. Depending on the design of the rollers, holding the fabric on the sides can also be ignored.

Figure 2A:
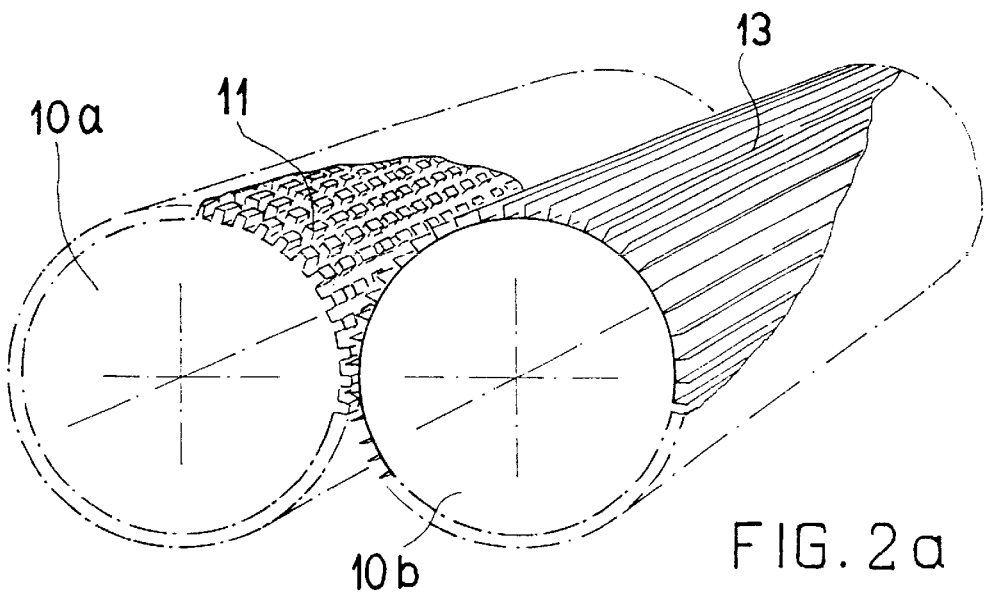
FIG. 2a shows in detail an embodiment of the stretching profile rollers.
Figure 2B:
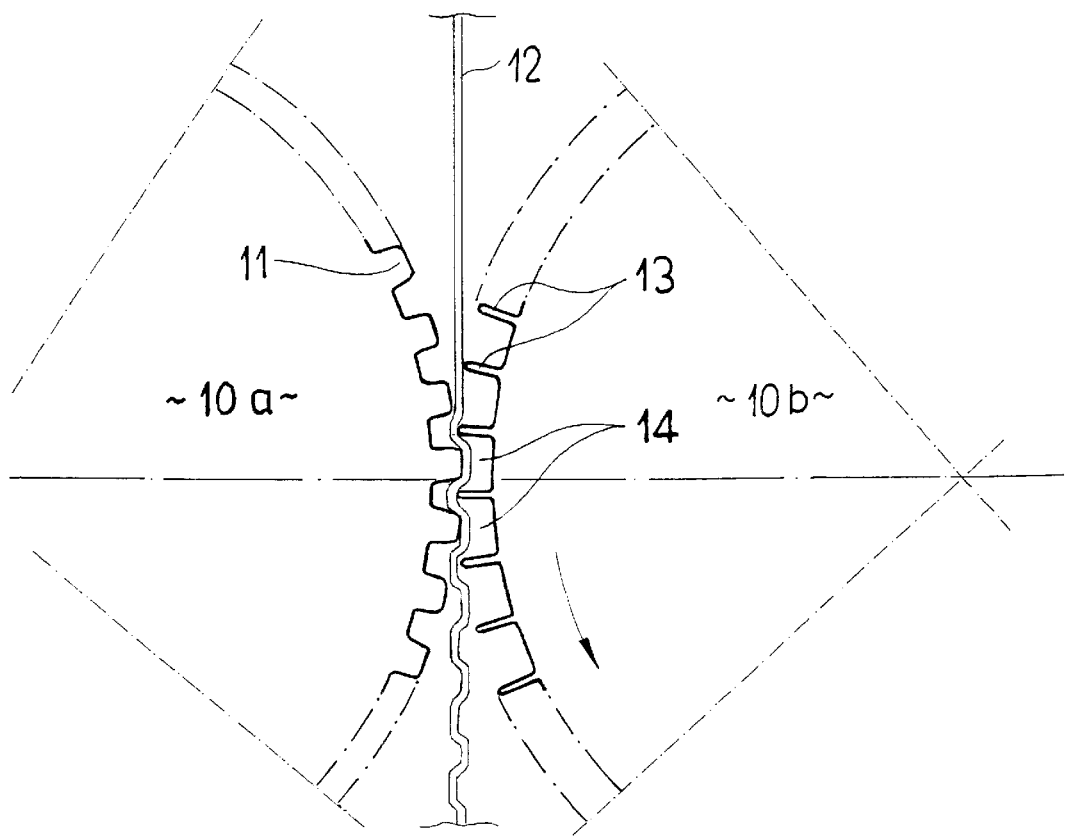

As FIGS. 2a and 2b show, the outer surface of the stretching profile rollers 10a and 10b is designed such that the portions sticking out, that is, the protrusions 11 protrude into the free spaces 14 between the lamellas 13 of the counter roller 10b, while the flat zone of the embossing tool holds tight the portion of the stretchable nonwoven fabric. The roller and the counter roller are precisely matched. The protrusions 11 are shown as truncated pyramids. They can also be round with pointed ends. A configuration with the tip in an onion tower shape is particularly well suited.

The lamellas 13 have a width of only about ⅓ to ⅕ of the free distances between the protrusions 11. In the example of the embodiment, they stretch across the entire length of the roller. However, they may also be shorter or interrupted. However, the lamella length always bridges a larger number of protrusion distances, namely, at least three protrusion distances.

The roller 10a is provided with a sheath or coating of steel. The protrusions 11 are also made of steel. The sheath of roller 10b is made of steel as well. The steel used is one with a Rockwell Hardness of 62 (cf. Meßmethoden [*Measurement Methods*] KLINGELNBERG, Technisches Hilfsbuch, Springer Verlag, 1967, 15. Auflage [*Technical Aids,* Springer Publishing, 1967, 15$^{th}$ Edition]).

The nonwoven 15 exiting from the rollers 10a and 10b has undergone a significant change not only in its fiber length but also in the structure of the nonwoven by the localized post-stretching. Through the respective roller design, the raw nonwoven receives a structure with a three-dimensional character, according to FIG. 3, as will be described below.

In the stretching area, the individual fiber becomes extremely strong such that the volume character becomes durable as well. The feel of the entire nonwoven becomes significantly softer and more pliable and exhibits a changed water transport vector. The moisture is transported from the surface to the back of the nonwoven along the protruding endless fibers.

The distance of the rollers of the second pair of rollers, and thus the engagement of the rollers into each other is adjustable, as is known in roller technology. In the case at hand, the protrusion height is about 1.5 mm with a distance of the protrusions from one another at about 1.5 mm. The number of protrusions per 100 cm$^2$ is 2500. For example, a cover stock material is made of spunbonded fabric by depositing in the same operation polypropylene fibers with a density of 7 grams per cm$^2$ onto a conveyor belt and during the same run depositing melt-blown polypropylene in an amount of 2×3 g per cm$^3$ and by covering this with an additional layer of 7 g per cm$^2$ polypropylene spunbonded fabric. This composite is initially fed to the roller device and spot-connected. The pre-solidified spunbonded fabric on polypropylene base is then fed to the second pair of rollers and perforated and reformed at a raised pattern roller temperature of 175° C. and a lamella roller temperature of 80° C.

Figure 3:
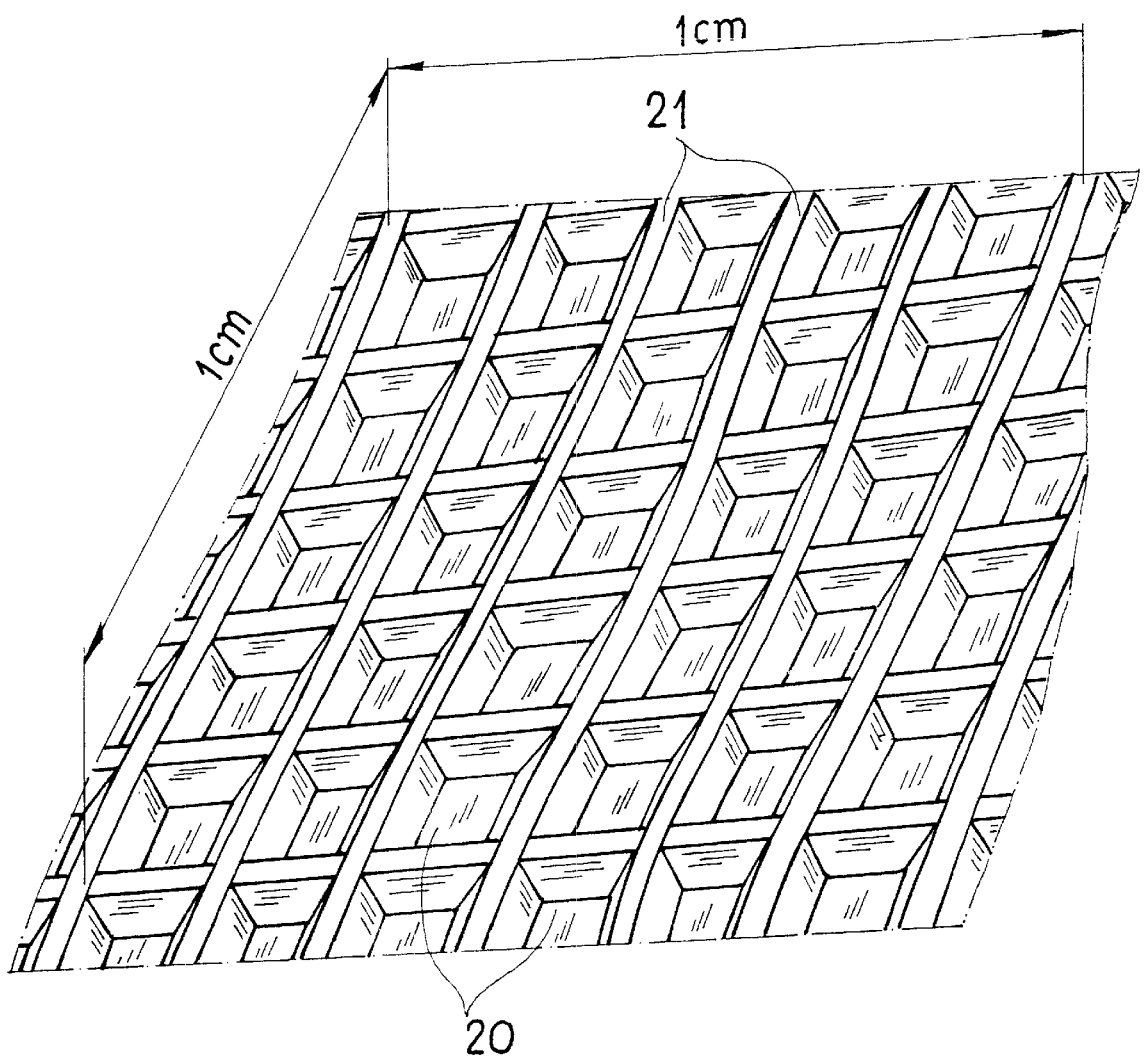
FIG. 3 is a magnified presentation of an overhead view in perspective of a product manufactured according to the process.

According to FIG. 3, this results in a foil material that, per centimeter, exhibits about 5 funnel-shaped depressions 20 formed by the male embossing elements with a flat area 21 remaining between the depressions. The height of the nonwoven, that is, the depth of the "cups" is about 1 mm. In the area of the male embossing elements, the material is perforated at the base and fully embossed, and can, therefore, be used as a hygiene product, for example as cover stock in the manufacture of diapers or as cover layer in the manufacture of female hygiene products.

The male embossing pattern that has resulted in the structuring is pyramid-shaped with a rectangular outline and an acute angle of 90°. The described method can also be used online with the spunbonded fabric production. However, a raw nonwoven can also be manufactured separately and then processed subsequently. A second nonwoven or a foil is to be laminated to the bulky nonwoven.

Similar to the main claim, in principle, the above mentioned method can be used with all synthetic materials that are suitable for the melt-spin method with a pre-stretching step, such as polyethylene, polyester, polypropylene, polyamide and similar materials.

In principle, the above mentioned method is suitable for using and processing nonwovens of all conventional manufacturing methods, including nonwoven fabrics manufactured by processes such as carding, airlaying or melt-blowing.

Nonwoven fabrics manufactured from staple fibers according to the carding method or the airlaying method that are manufactured from staple fibers, that is, fibers cut to a length of 3 to 6 cm of fibers of 2 to 5 den by using a carding instrument, are slightly pre-embossed and then entered into the reforming process subject to the invention.

With airlaid nonwoven fabrics, the staple fibers are transported through the air stream and deposited in a fine nonwoven form on a colander drum. This nonwoven pre-solidified by embossing is then entered into the reforming process subject to the invention.

Staple fiber nonwoven materials can be reformed because they still have a remaining capability for stretching stemming from the shiftability of the staple fibers and from their crimping. Carding and airlaid nonwoven fabrics are used in weight layers of 15 g/m² to 30 g/m², and if required with even greater area weights.

Melt-blown nonwoven fabrics are obtained from a polymeric melt by tearing the drop exiting from the spinning nozzle into very fine individual fibers. The individual fibers are taken up by the air stream and deposited in the form of a nonwoven onto a conveyer belt. Melt-blown fibers are very delicate and soft. Because of their insufficient strength, they are often combined with other nonwovens. In hygiene applications, melt-blown nonwovens made according to the invention can be used by themselves or in connection with other nonwovens. In particular, a nonwoven fabric made of melt-blown fibers with an area weight of 10 g/m² to 20 g/m² is well suited for reforming.

There has thus been shown and described a novel embossing method for producing a structured voluminous nonwoven which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a method for producing a structured voluminous nonwoven comprising the following processing steps:
    (a) manufacturing a spunbonded fabric consisting of a multitude of monofilaments that are stretched only at 50 to 70% of the maximum possible stretch range and are deposited as a fiber strand,
    (b) pressing and welding the fiber strand into a raw nonwoven by using a first pair of rollers, and
    (c) subsequently processing the raw nonwoven by using a second pair of rollers, where at least one of the outer roller surfaces is made of metal and that consists of a positive roller with numerous projecting elements distributed across the outer surface of the roller, and of a negative roller with equally numerous recesses, where during the rolling process the projecting elements engage in the recesses and post-stretch the raw nonwoven in the area of the roller engagement, the improvement wherein the outer surfaces of the second pair of rollers are made of metal, wherein the projecting elements of the positive roller are protrusions arranged in rows and wherein the surface of the negative roller exhibits lamellas arranged in an axial direction with recesses between said lamellas such that during the rolling operation of the rollers the lamellas engage in the channels left free by the protrusions, which locally holds the nonwoven and stretches in the area immediately adjacent.

2. Method as set forth in claim 1, wherein the rollers of the roller pair consist of metal with basically the same hardness, namely a Rockwell Hardness (HRC) of greater than 50.

3. Method as set forth in claim 1, wherein the distance of the rollers of the second roller pair, and thus the mutual engagement of the rollers, can be adjusted.

4. Method as set forth in claim 1, wherein the height of the protrusions is between 0.8 and 2 mm.

5. Method as set forth in claim 1, wherein the distance of the protrusions from one another in linear order is between 1 and 2.5 mm.

6. Method as set forth in claim 1, wherein the number of protrusions per 100 cm² of roller surface is between 2000 and 3000.

7. Method as set forth in claim 1, wherein the temperature of the rollers of the second pair of rollers is set differently.

8. Method as set forth in claim 7, wherein the temperature of the negative roller is set to a temperature that is at least 20° C. lower than that of the positive roller.

9. Method as set forth claim 1, wherein during the second stretching process the raw nonwoven strand is kept at a temperature that in general corresponds to the temperature that existed during the first stretching.

10. Method as set forth in claim 1, wherein the protrusions end in tips.

11. Method as set forth in claim 10, wherein the tips have an onion-tower shape.

12. Method as set forth in claim 11, wherein the tips end as pyramid-shaped tips with an acute angle of 90±20°.

13. Method as set forth in claim 1, wherein polyethylene, polypropylene or polyamide is used as starting material for the production of the nonwoven.

14. Method as set forth in claim 1, wherein fabrics used as nonwovens are those manufactured by processes such as carding, airlaying or melt-blowing.

15. Method as set forth in claim 1, wherein during the second stretching the raw nonwoven strand is held tight to the side at the edges of the rollers.

16. Method as set forth in claim 1, wherein the second stretching that occurs in the recesses leads to a significant thinning even to a perforation of the raw nonwoven in the area of the roller engagement.

17. Roller pair for carrying out the method as set forth in claim 1, wherein the outer surfaces of the second pair of rollers are made of metal, the projecting elements of the positive roller are protrusions arranged in rows and the surface of the negative roller exhibits lamellas arranged in an axial direction with recesses between said lamellas such that during the rolling operation of the rollers the lamellas engage in the channels left free by the protrusions.

18. Roller pair as set forth in claim 17, wherein the rollers of the roller pair consist of metal with basically the same hardness, namely a Rockwell Hardness (HRC) of greater than 60.

19. Roller pair as set forth in claim 17, wherein the distance of the rollers of the second roller pair, and thus the mutual engagement of the rollers, is adjustable.

20. Roller pair as set forth in claim 17, wherein the height of the protrusions is between 0.8 and 2 mm.

21. Roller pair as set forth in claim 17, wherein the distance of the protrusions from one another in linear order is between 1 and 2.5 mm.

22. Roller pair as set forth in claim 17, wherein the number of protrusions per 100 $cm^2$ of roller surface is between 2000 and 3000.

23. Roller pair as set forth in claim 17, wherein the protrusions end in tips.

24. Roller pair as set forth in claim 23, wherein the tips have an onion-tower shape.

25. Roller pair as set forth in claim 24, wherein the tips end as pyramid-shaped tips with an acute angle of 90±20°.

* * * * *